(12) United States Patent
Pinter

(10) Patent No.: US 7,843,620 B2
(45) Date of Patent: Nov. 30, 2010

(54) MICROMIRROR SYSTEM

(75) Inventor: Stefan Pinter, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 403 days.

(21) Appl. No.: 11/999,808

(22) Filed: Dec. 7, 2007

(65) Prior Publication Data

US 2008/0144149 A1 Jun. 19, 2008

(30) Foreign Application Priority Data

Dec. 14, 2006 (DE) ........................ 10 2006 059 073

(51) Int. Cl.
*G02B 26/08* (2006.01)
(52) U.S. Cl. .................................... 359/224.1
(58) Field of Classification Search .............. 359/212.1, 359/223.1–226.1, 290, 291, 871, 872
See application file for complete search history.

(56) References Cited

U.S. PATENT DOCUMENTS 5,417,312 A * 5/1995 Tsuchitani et al. ...... 188/181 A
6,088,145 A * 7/2000 Dickensheets et al. ... 359/201.1

* cited by examiner

*Primary Examiner*—Euncha P Cherry
(74) *Attorney, Agent, or Firm*—Kenyon & Kenyon LLP

(57) ABSTRACT

A micromirror system having at least two micromirrors, each suspended on a substrate wafer via at least one torsion spring. The axes of rotation of the micromirrors are disposed essentially perpendicular to each other in order to permit deflection of an optical beam in two directions essentially perpendicular to each other. The micromirrors and the torsion springs are patterned out of the substrate wafer and lie essentially in one plane.

23 Claims, 3 Drawing Sheets

MICROMIRROR SYSTEM

FIELD OF THE INVENTION

The present invention relates to a micromirror system, for the deflection of an optical beam, which can be used in head-up displays, projectors or scanners.

BACKGROUND INFORMATION

Micromirrors are described in the related art which have two axes of rotation that are perpendicular to each other, so that light can be deflected not only in one plane, but in two planes. For example, presently such micromirrors are contemplated for head-up displays in the automotive sector, but also for other applications such as image projectors and 2-D scanners.

To permit the mobility of a micromirror in two planes, the micromirror is usually doubly suspended cardanically on torsion springs. In so doing, for example, the micromirror may be surrounded by an inner cardan frame and joined to this inner cardan frame via a pair of aligned torsion joints. In turn, the inner cardan frame is joined via aligned torsion joints to an outer cardan frame. However, the cardanic suspension has the disadvantage that it is relatively complicated in design and actuation, and in addition, also has disadvantages with respect to the dynamic properties of the micromirror.

Alternatively, two individual micromirrors may also be mounted in tandem in freely suspended manner with, in each case, only one axis of rotation, perpendicular to each other in the optical path. In this case, the suspension mount or the torsion joint lies in a plane different from the mirror plane. The individual mirror elements may be side-by-side mounted virtually without gap. However, this has the disadvantage that the optical adjustment of the mirrors in the optical path is relatively complicated. For example, an imprecise mounting results if the micromirrors are only inserted or put on. Their position is then often indefinite, and specially adapted tools are needed to align the micromirrors exactly.

SUMMARY OF THE INVENTION

Therefore, an object of the present invention is to provide an improved micromirror system, with which an optical beam may be deflected in two directions perpendicular to each other.

In this context, the micromirror system has the advantage that the at least two micromirrors and their suspension via torsion springs are in each case patterned out of a substrate wafer. Thus, no complicated adjustment of the micromirrors is necessary, since the micromirrors and their suspension are in one defined position, that is, essentially in one plane relative to each other.

The present invention further attains a defined damping of the micromirrors by introducing a suitable gas medium into the hermetically sealed volume of the wafer in which the mirrors are situated, preferably under a defined pressure.

In addition, the present invention attains a defined damping of the micromirrors by the provision of fixed and/or movable structures staggered relative to each other and partially overlapping, which are applied on the respective mirror and on the wafer housing. The intensity of the damping of the micromirror may be adjusted by varying the spacing and area of the fixed and/or movable structures.

A further attainment of the present invention is that, by providing electrodes tilted toward the mirrors, the electrically effective distance between the electrodes and an assigned mirror is shortened. In this way, a smaller electric voltage is necessary to deflect the mirror. Furthermore, the rotational angle of the mirror is not restricted.

DETAILED DESCRIPTION

Figure 1:
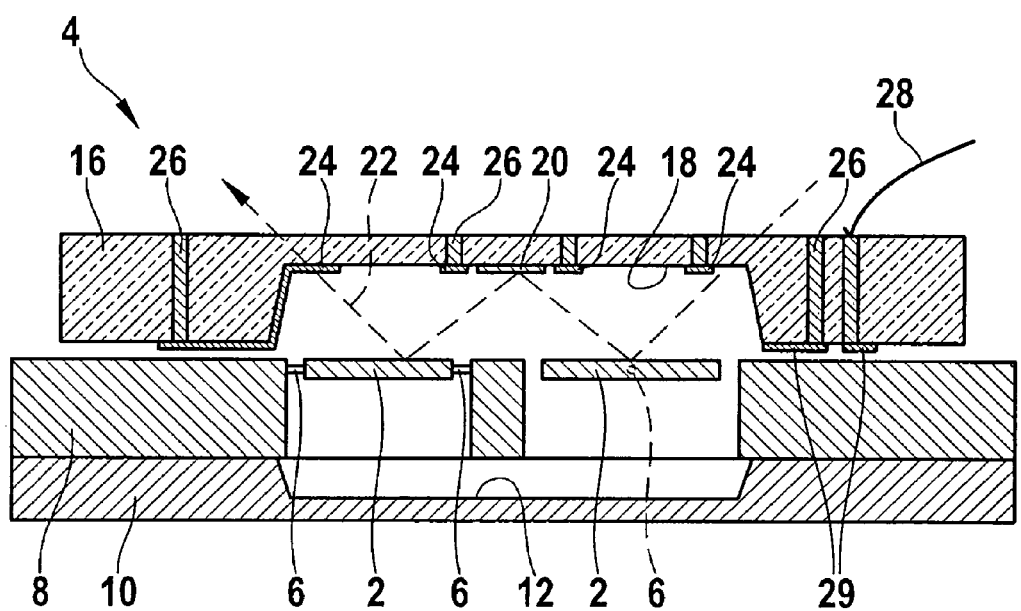
FIG. 1 shows a schematic cross-sectional view of a first specific embodiment of a micromirror system according to the present invention.

Hereinafter in the different specific embodiments of the invention, essentially identical or similar parts are provided with the same reference numerals.

In the first specific embodiment as shown in a cross-sectional view in FIG. 1, a micromirror system 4 is made up, for example, of at least two micromirrors 2. Micromirrors 2 in each case are suspended on two opposite sides centrally or along one of their axes of symmetry, on torsion springs 6. Preferably, torsion springs 6 of the two micromirrors 2 are disposed essentially perpendicular to each other, as shown in the top view in FIG. 3. Besides the planar, quadrangular shape shown in FIGS. 1 and 2, micromirrors 2 may have any planar shape as desired, for example, a circular, oval or multi-angular shape, or perhaps a curved shape, for instance, in the form of an imaging concave mirror.

Micromirrors 2 are patterned or etched out of a substrate wafer 8. In so doing, micromirrors 2 may be produced, for instance, by anisotropic trench etching and deposition of electrically insulating or conductive layers. Torsion springs 6 are likewise patterned out of substrate wafer 8, in that they are exposed by etching away suitable areas of substrate wafer 8. In doing this, micromirrors 2 and torsion springs 6 of the micromirror system are joined to each other in one piece. Alternatively, metallic torsion springs 6 may be provided, which are able to be produced by additive deposition. In this case, micromirrors 2 and torsion springs 6 of the micromirror system are patterned as separate parts out of substrate wafer 8, torsion springs 6 taking the form of metallic, elastic torsion springs.

After forming micromirrors 2 in substrate wafer 8, it is sealed on its back side, e.g., by a base wafer 10. In so doing, preferably base wafer 10 may be joined or bonded to substrate wafer 8 anodically or with the aid of a glass solder or using another suitable adhesive agent. Optionally, base wafer 10 may in addition have a cutout 12 in mirror area 2. This has the advantage that larger rotational angles are thereby made possible for micromirrors 2.

On the front side of substrate wafer 8, a cover wafer 16 is mounted, preferably having a suitable recess 18 to thereby allow a correspondingly large rotational angle of micromirrors 2. Preferably the hollow space in which micromirrors 2 are located is able to be hermetically sealed via cover wafer 16 and base wafer 10. This has the advantage that subsequently, it is possible to easily dice up the wafer using standard methods such as sawing.

Preferably, cover wafer 16 may be made at least partially or completely of a transparent glass and/or plastic. On its inner side facing micromirrors 2, preferably cover wafer 16 may include at least one reflecting mirror 20 in order to deflect an optical beam 22, e.g., a light beam or laser beam, from one micromirror 2 to the next micromirror 2 as shown by way of example in the optical beam path in FIGS. 1 and 3 through 6. For example, depending on its function, this reflecting mirror 20 may be disposed so that it is laterally offset between the two individual micromirrors 2, in order to suitably deflect optical beam 22. In addition, reflecting mirror 20 may be fixedly joined to cover wafer 16 or secured to it in a manner allowing movement.

To produce a conductive connection and/or to ensure optimal reflective properties, micromirrors 2 and reflecting mirror 20, respectively, may be provided with a metallization on their surface.

Figure 3:
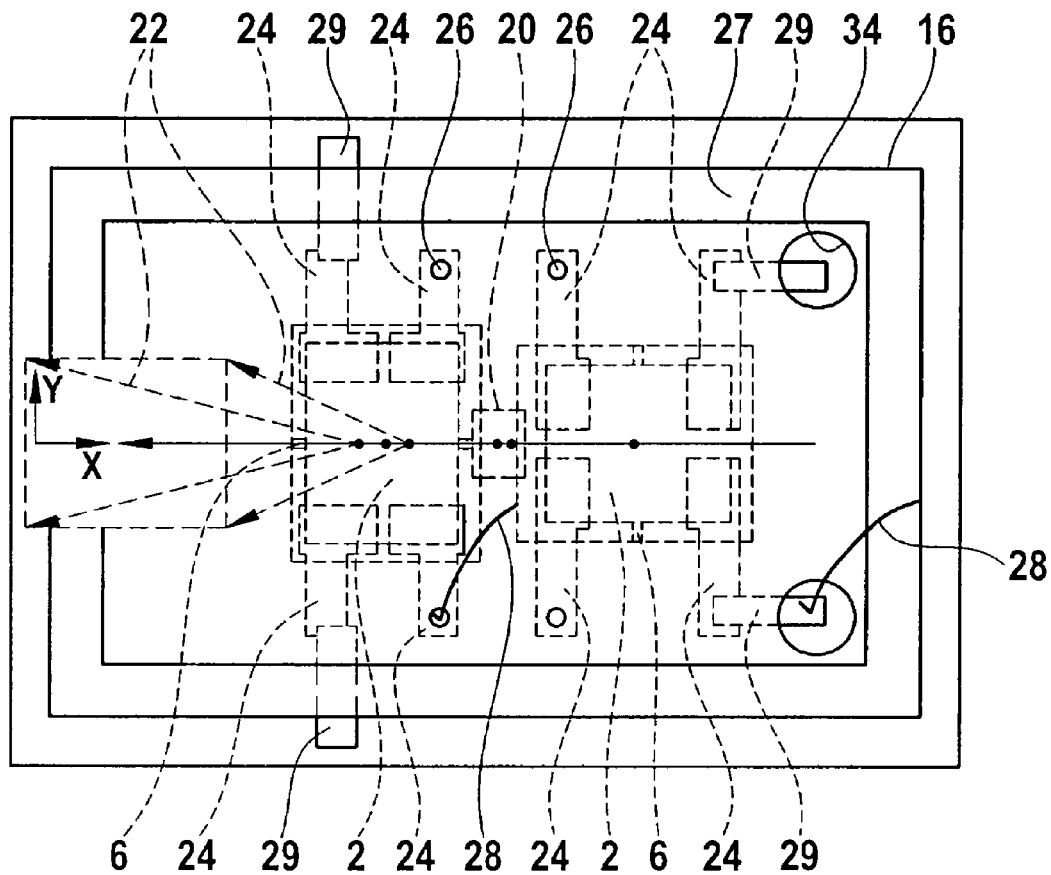
FIG. 3 shows a schematic top view of a second specific embodiment of the micromirror system according to the present invention.

In addition, on the inner side of cover wafer 16 is at least one static electrode 24 or, as shown in the second specific embodiment in FIG. 3, a plurality of static electrodes 24 for in each case one micromirror 2. In this context, corresponding electrode 24 may be used for the electrostatic drive and/or for the capacitive measurement of a micromirror deflection.

For the electrostatic drive of micromirror 2, a suitable voltage is applied to electrode 24 assigned to mirror 2. In so doing, an electrostatic attractive force is generated between electrode 24 and micromirror 2 which, in this case, acts as counter-electrode. The smaller the distance between electrode 24 and micromirror 2, the greater the electrostatic attractive force between the electrode surfaces, and the smaller the electric voltage which must be applied. In principle, however, a plurality of electrodes 24 may also be provided. Depending upon between which electrode 24 and micromirror 2 a voltage is applied, micromirror 2 is deflected in the direction of respective electrode 24. The number and arrangement of electrodes 24 in FIGS. 1 and 4 through 6 is merely by way of example and may be varied as desired.

To detect the mirror deflection, the electric capacitance between electrodes 24, mounted on the inner side of cover wafer 16, and micromirror 2 acting in this case as counter-electrode may be measured. Optionally, one, two or more suitably mounted capacitors may be connected as differential capacitors for this purpose. In this way, it is possible to obtain an electric signal proportional to the mirror deflection.

In this context, one or more electrostatic capacitances may be measured between in each case one electrode 24 and swiveling micromirror 2. A change in a capacitance between a specific electrode 24 and movable micromirror 2 permits a direct conclusion about the deflection of micromirror 2 in the direction of static electrode 24 toward or away from it Optionally, electrodes 24 for the electrostatic drive and/or for the capacitive measurement of the mirror deflection may also be mounted on the front side of base wafer 10, the front side being directed inwardly toward micromirrors 2. In this case, alternatively at least one electrode 24 may also be additionally provided for the capacitive measurement and/or the deflection of reflecting mirror 20, provided it is disposed in a manner allowing movement (not shown).

The mechanical properties of the mirrors, particularly the resonant frequency, may be designed, for example, by way of the mirror form, mirror dimensions, stiffness of the torsion springs, etc., for each of micromirrors 2 and reflecting mirror 20, respectively, separately and independently of the other mirrors. By the controlled application of voltages of the same or opposite polarity to electrode 24 and the mirror surface, reciprocal attractive and repulsive forces come about between electrode 24 and the mirror, so that micromirror 2 is set into vibration. In the resonance case, relatively low energies are necessary.

Electrical plated-through holes 26 may be implemented in cover wafer 16. On the back side of cover wafer 16, plated-through holes 26 produce the electrical connection to electrodes 24. With an additional suitable metallization 29 on the back side, additionally a bonding wire 28 may be bonded on the plated-through hole area in order to provide an electrical contact.

Figure 4:
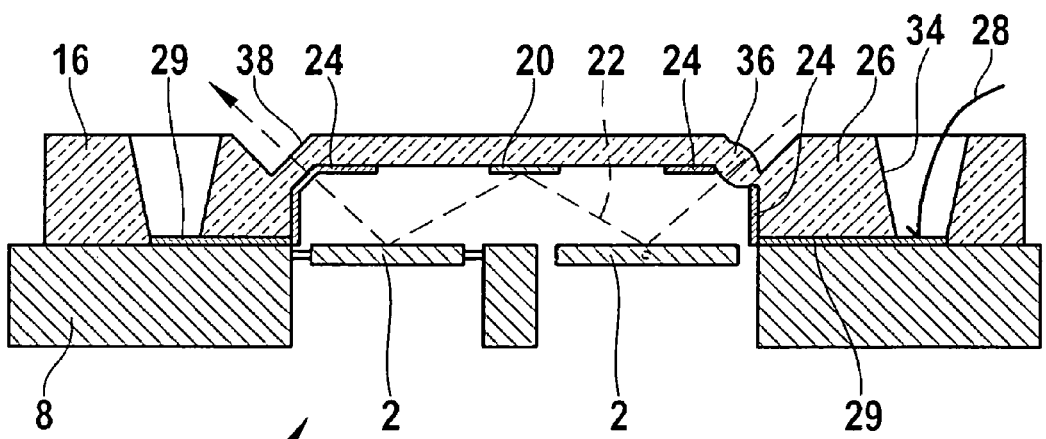
FIG. 4 shows a schematic cross-sectional view of a third specific embodiment of the present invention.
Figure 5:
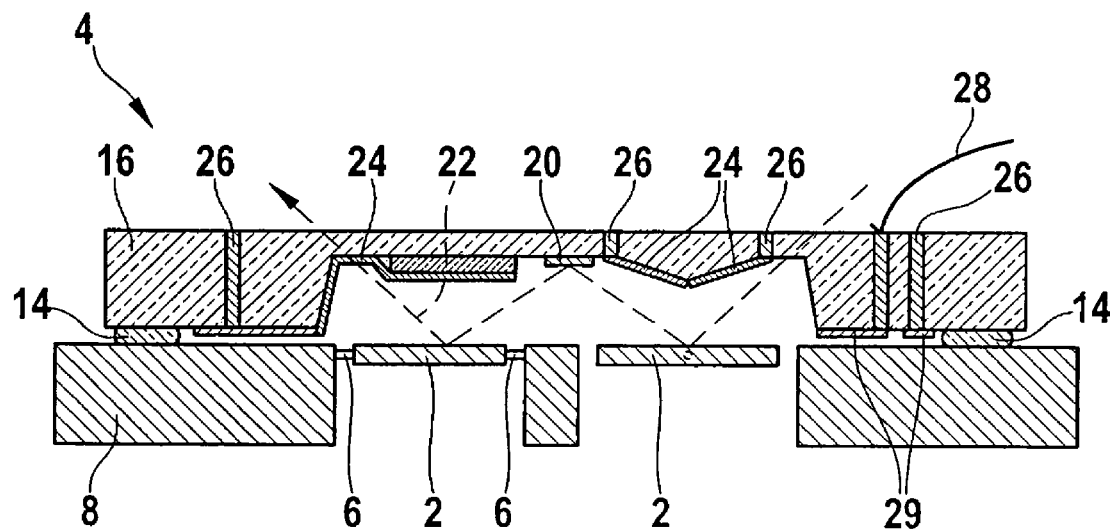
FIG. 5 shows a schematic cross-sectional view of a fourth specific embodiment of the present invention.
Figure 6:
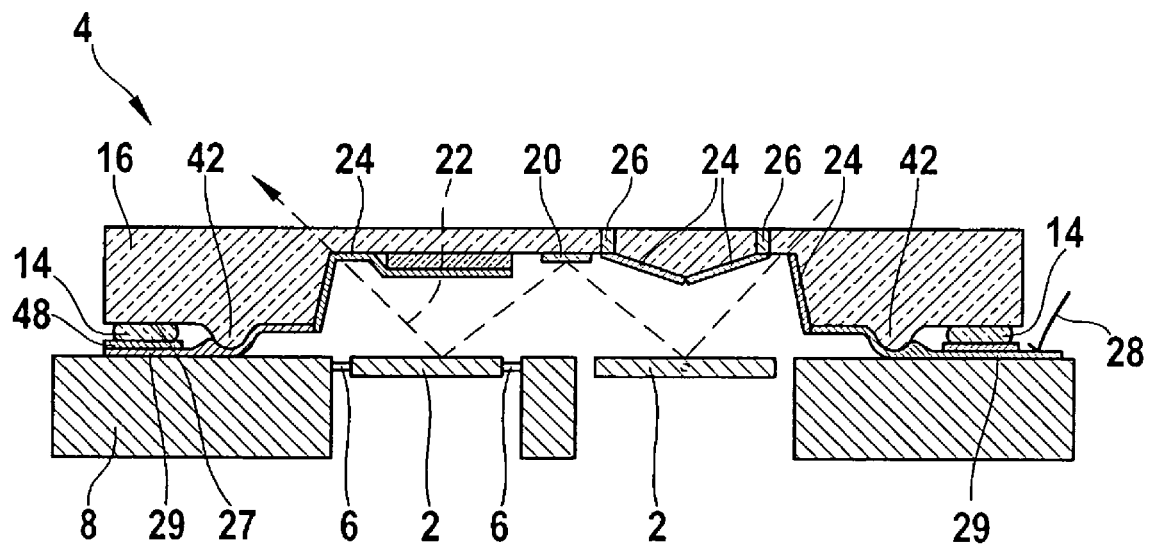
FIG. 6 shows a schematic cross-sectional view of a fifth specific embodiment of the present invention.

Preferably, cover wafer 16 may be joined or bonded to substrate wafer 8 anodically as shown in FIG. 4, or with the aid of a glass solder 14 as shown in FIGS. 5 and 6, or using another suitable adhesive agent. In so doing, an electrical contact is able to be produced between metallization 29 on cover wafer 16 and substrate wafer 8.

For the controlled adjustment of the damping of micromirrors 2 or of a movable reflecting mirror 20 (not shown), a suitable gas medium, e.g., a protective gas medium such as nitrogen may be introduced with suitable pressure in the hermetically sealed volume in which the mirrors are located.

Figure 2:
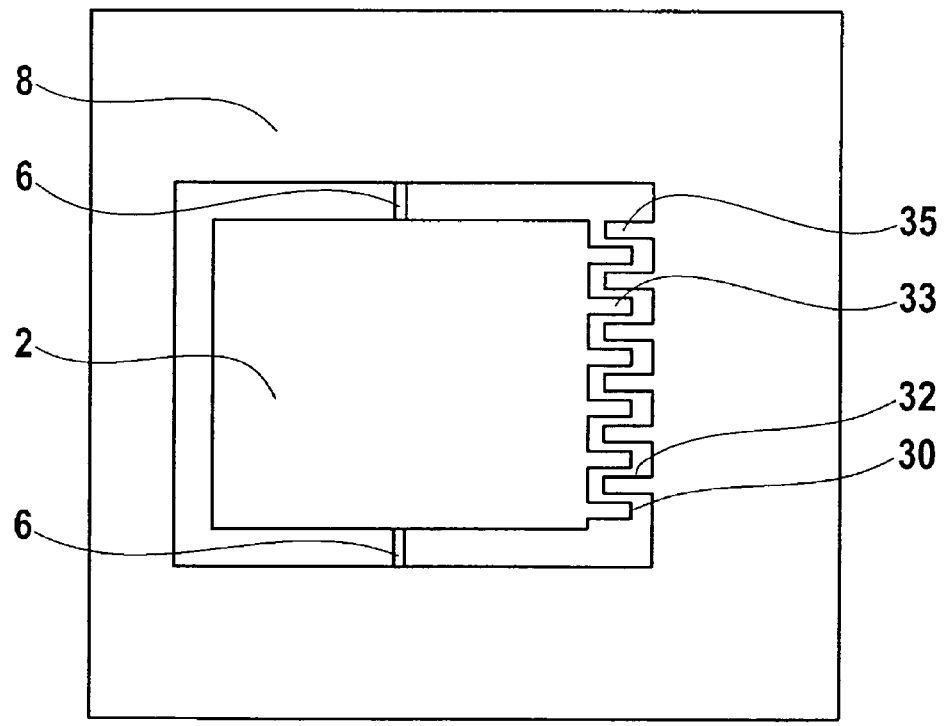
FIG. 2 shows a schematic top view of a structure for adjusting a mirror damping.

As shown schematically in FIG. 2, moreover a predetermined damping of micromirror 2 may be achieved by disposing a structure 30 of micromirror 2 (thus structure 30 is movable) so that it is offset with respect to an opposite fixed structure 32 of substrate wafer 8, the two structures 30, 32 partially overlapping.

In this context, the two structures may in each case be in the form of at least one projection or finger segment 33, 35 on micromirror 2 or substrate wafer 8. The movable or also partially flexible, and fixed projections 33, 35 are disposed opposite and offset relative to each other, whereby they partially overlap. The intensity of the damping of micromirror 2 may be varied via the spacing and the area of structures 32, 30 fixed to the substrate wafer and fixed to the micromirror. In this context, the areas and/or spacings of projections 33, 35 may in each case be the same or vary.

The second specific embodiment of the present invention is shown in a top view in FIG. 3, a circumferential glass-solder joining surface 27 being drawn in between cover wafer 16 and substrate wafer 8. In each case two electrodes 24 are situated opposite each mirror half 2. Four electrodes 24 have a metallization 29 for an electrical lead. In addition, cover wafer 16 has electrical plated-through holes 26, which produce an electrical connection to four electrodes 24 in FIG. 3. On the outer side of cover wafer 16, optionally an additional bonding wire 28 is bonded on one of plated-through holes 26 for a micromirror. In the case of two further electrodes 24, a through hole 34 is provided in cover wafer 16 for the electrical contacting; additionally, a bonding wire 28 may be bonded onto metallization 29. The individual elements of the contacting of electrodes 24 are each shown again in FIGS. 1 and 4-6 in a cross-sectional view.

In addition, in FIG. 3, the optical beam path is shown from above. FIG. 3 further shows the deflection of optical beam 22 at different points of incidence on reflecting mirror 20 and downstream micromirror 2.

In the second specific embodiment (FIG. 3) and in the third through fifth specific embodiments (FIGS. 4-6) explained in greater detail in the following, base wafer 10 is not depicted graphically. Actually, however, these specific embodiments may likewise have a base wafer 10 as shown in FIG. 1.

In the third specific embodiment as shown in FIG. 4, substrate wafer 8 is joined to cover wafer 16, e.g., by anodic bonding. In this case, the electrical contact may be accomplished by a cutout or suitable through holes 34. A bonding wire 28 may be bonded onto a corresponding metallization 29. In the first, second and third specific embodiments (FIGS. 1, 3, 4), electrodes 24 are disposed essentially parallel to the neutral position of micromirrors 2.

Cover wafer 16 is preferably formed in such a way that optionally, one or more additional optical elements such as at least one lens 36 and/or at least one entrance window or exit window 38 may be provided. In so doing, for example, entrance and exit windows 38 may be disposed at different angles in cover wafer 16 depending on the intended purpose. Moreover, optionally an additional adjustment structure (not shown) for adjusting the wafers and/or at least one separating trench (not shown) for the subsequent separation of the wafer housing may be provided. Cover wafer 16 having the aforesaid additional elements may be produced by methods such as deep drawing. Naturally, this holds true for base wafer 10, as well.

The fourth specific embodiment of the present invention as shown in FIG. 5 differs from the first through third specific embodiments (FIGS. 1, 3, 4) essentially in that the surfaces of electrodes 24 on the inner side of cover wafer 16 are inclined, that is, are suitably tilted with respect to the neutral position of micromirrors 2. This tilting of the surface of electrodes 24 has the advantage that the electrically effective distance between electrodes 24 and the micromirror surfaces, which act as counter-electrodes, may be reduced. This is advantageous in that, due to the tilted electrode surface, a smaller electric voltage is necessary for deflecting mirrors 2 about predetermined angles. As already described above, it holds that the smaller the electrode spacing, accompanied by the same voltage difference, the greater the electrostatic attractive force between the electrode surfaces. Owing to the tilted electrode surfaces, a smaller electrical voltage is necessary to deflect mirrors 2 about a specific angle in comparison to the electrode configurations of the first through third specific embodiments. In general, lower voltages are advantageous during operation, since the danger of electrical sparkovers may be decreased. Moreover, the expenditure for the generating, conduction and insulation of the high voltage may be reduced. Safety aspects may thereby be influenced in a positive manner.

In the fourth specific embodiment, a glass solder 14 is provided for bonding or joining substrate wafer 8 to cover wafer 16. Electrical plated-through holes 26 are provided in cover wafer 16 which, on the inner side of cover wafer 16, produce an electrical connection to electrodes 24 mounted at an angle.

Like the fourth specific embodiment, the fifth specific embodiment of the present invention as shown in FIG. 6 has tilted electrode surfaces. In addition, a glass solder 14 is likewise provided for bonding or joining substrate wafer 8 to cover wafer 16. In this case, however, additionally a spacer 42 may be provided. Spacer 42 has the advantage that the distance between cover wafer 16 and substrate wafer 8 may be set in defined manner, and essentially may be maintained circumferentially over the entire wafer. This further has the advantage that a predetermined and uniform spacing of cover wafer 16 and substrate wafer 8 easily permits the adjustment of a correct optical beam path.

At the location of spacer 42, optionally an electrical contact may be produced between the metallization on cover wafer 16 and substrate wafer 8. To this end, substrate wafer 8 may have a metallization 29 for an electrical lead that is connected via a metallization of spacer 42 to an electrical contacting of cover-wafer electrode 24. In this context, a bonding wire 28 may be bonded on substrate wafer 8. If the intention is to implement the electrical lead via substrate wafer 8, then in the area of glass-solder joining surface 27, metallization 29 may be provided with an additional insulating layer 48.

In all specific embodiments of the present invention, in each case the surfaces of electrodes 24 may alternatively be tilted and/or disposed essentially parallel to the neutral position of micromirrors 2 and reflecting mirror 20, respectively. Furthermore, substrate wafers 8 and cover wafers 16 or substrate wafers 8 and base wafers 10 may be joined to each other by anodic bonding, a glass solder 14 or by another suitable adhesive agent or method (adhesive bonding). A spacer 42 may be provided and an additional electrical insulating layer 48 on metallization 29, in order to provide an electrical lead via substrate wafer 8.

Furthermore, all specific embodiments of the present invention may have a cover wafer 16 having additional optical elements such as at least one lens 36 and/or at least one entrance window or exit window 38, as well as, optionally, adjustment structures and/or separating trenches in addition. Furthermore, the damping of the mirrors may be adjusted, for example, with the aid of a configuration according to FIG. 2. In addition, preferably the housing of all specific embodiments may be hermetically sealed. Optionally, a suitable gas medium may additionally be filled under a predetermined pressure into the hermetically sealed volume in which the mirrors are located in order to adjust a defined damping. Moreover, in all specific embodiments of the present invention, differential capacitors may be connected, and electrodes 24 may be used for the electrostatic drive and/or the capacitive measurement of the mirror deflection.

What is claimed is:

1. A micromirror system comprising:
   a substrate wafer;
   at least one torsion spring; and
   at least two micromirrors, each being suspended on the substrate wafer via the at least one torsion spring, axes of rotation of the micromirrors being situated substantially perpendicular to each other to permit deflection of an optical beam in two directions substantially perpendicular to each other,
   wherein the micromirrors and the at least one torsion spring are patterned out of the substrate wafer, and lie substantially in one plane,
   wherein a hermetically sealed volume of a wafer in which the micromirrors and the reflecting mirror are situated is filled with a gas medium, under a predetermined pressure, in order to damp the mirrors, the gas medium being a protective gas, and
   wherein for a predetermined damping of the micromirrors, a structure of the micromirrors is offset with respect to an opposite structure of the substrate wafer, the two structures partially overlapping.

2. The micromirror system according to claim 1, further comprising:
   a base wafer, wherein, on its lower side, the substrate wafer is closed by the base wafer, the base wafer having at least one cutout in an area of the micromirrors.

3. The micromirror system according to claim 2, further comprising:
   a cover wafer, wherein on its upper side, the substrate wafer is hermetically sealed by the cover wafer, and at least one reflecting mirror is one of statically and movably situated on the cover wafer in a manner that it is laterally offset with respect to two micromirrors.

4. The micromirror system according to claim 1, further comprising:
  electrodes for at least one of an electrostatic drive and a capacitive measurement of a micromirror deflection, the electrodes being situated on at least one of the cover wafer and a bottom of the base wafer.

5. The micromirror system according to claim 3, wherein at least one of (a) the micromirrors and (b) the reflecting mirror are formed as counter-electrodes by providing them with a metallization.

6. The micromirror system according to claim 1, further comprising:
  at least one electrode situated in a plane parallel to a neutral position of a respective micromirror, in a wafer housing, in one of a cover wafer and a base wafer.

7. The micromirror system according to claim 1, further comprising:
  at least one electrode situated, tilted relative to a neutral position of a respective micromirror, in a wafer housing, in at least one of a cover wafer and a base wafer.

8. The micromirror system according to claim 3, wherein at least one of (a) the substrate wafer and the cover wafer are joined and (b) the substrate wafer and the base wafer are joined, the joining being at least one of (c) anodically, (d) with the aid of a glass solder and (e) by another suitable adhesive agent.

9. The micromirror system according to claim 3, wherein the cover wafer has an at least partially circumferential spacer, an electrical contact being situated between metallizations on the cover wafer and the substrate wafer, and further comprising an insulating layer situated at least in an area of the metallization on the substrate wafer.

10. The micromirror system according to claim 1, wherein damping intensity of the micromirror is adjusted by varying a spacing and area of the micromirrors and the structure of the substrate wafer.

11. The micromirror system according to claim 7, wherein the at least one electrode is tilted toward the mirror, thereby shortening an electrically effective distance between the at least one electrode and the mirror.

12. The micromirror system according to claim 1, wherein the at least one torsion spring is produced by additive deposition.

13. The micromirror system according to claim 3, wherein the cover wafer is made at least partially one of transparent (a) glass and (b) plastic.

14. The micromirror system according to claim 1, further comprising:
  an electrode configured to capacitive measurement of the micromirror deflection.

15. The micromirror system according to claim 14, wherein a plurality of capacitors are connected as differential capacitors.

16. The micromirror system according to claim 1, wherein the gas medium includes pressurized nitrogen.

17. The micromirror system according to claim 1, further comprising:
  a base wafer, wherein, on its lower side, the substrate wafer is closed by the base wafer, the base wafer having at least one cutout in an area of the micromirrors;
  a cover wafer, wherein, on its upper side, the substrate wafer is hermetically sealed by the cover wafer, and at least one reflecting mirror is one of statically and movably situated on the cover wafer in a manner that it is laterally offset with respect to two micromirrors; and
  electrodes for at least one of an electrostatic drive and a capacitive measurement of a micromirror deflection, the electrodes being situated on at least one of the cover wafer and a bottom of the base wafer.

18. The micromirror system according to claim 3, wherein at least one of (a) the micromirrors and (b) the reflecting mirror are formed as counter-electrodes by providing them with a metallization, and wherein at least one of (a) the substrate wafer and the cover wafer are joined and (b) the substrate wafer and the base wafer are joined, the joining being at least one of (c) anodically, (d) with the aid of a glass solder and (e) by another suitable adhesive agent.

19. The micromirror system according to claim 3, wherein the cover wafer has an at least partially circumferential spacer, an electrical contact being situated between metallizations on the cover wafer and the substrate wafer, and further comprising an insulating layer situated at least in an area of the metallization on the substrate wafer.

20. The micromirror system according to claim 1, further comprising:
  at least one electrode situated in a plane parallel to a neutral position of a respective micromirror, in a wafer housing, in one of a cover wafer and a base wafer,
  wherein damping intensity of the micromirror is adjusted by varying a spacing and area of the micromirrors and the structure of the substrate wafer.

21. The micromirror system according to claim 1, further comprising:
  at least one electrode situated, tilted relative to a neutral position of a respective micromirror, in a wafer housing, in at least one of a cover wafer and a base wafer,
  wherein damping intensity of the micromirror is adjusted by varying a spacing and area of the micromirrors and the structure of the substrate wafer.

22. The micromirror system according to claim 7, further comprising:
  an electrode configured to capacitive measurement of the micromirror deflection;
  wherein the at least one electrode is tilted toward the mirror, thereby shortening an electrically effective distance between the at least one electrode and the mirror, and wherein damping intensity of the micromirror is adjusted by varying a spacing and area of the micromirrors and the structure of the substrate wafer.

23. The micromirror system according to claim 22, wherein the at least one torsion spring is produced by additive deposition, and wherein a plurality of capacitors are connected as differential capacitors, wherein the cover wafer is made at least partially one of transparent (a) glass and (b) plastic, and wherein the gas medium includes pressurized nitrogen.

* * * * *